(12) United States Patent
Gibson

(10) Patent No.: US 6,990,732 B2
(45) Date of Patent: Jan. 31, 2006

(54) METHOD OF MANUFACTURING A MICROMETER-SCALED ELECTRONIC-CHARGE-TRANSFERRING DEVICE

(75) Inventor: Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 177 days.

(21) Appl. No.: 09/995,765

(22) Filed: Nov. 29, 2001

(65) Prior Publication Data

US 2003/0099080 A1 May 29, 2003

(51) Int. Cl.
*H01R 43/00* (2006.01)

(52) U.S. Cl. .................. 29/825; 29/900; 310/309; 361/255; 977/DIG. 1

(58) Field of Classification Search ............. 29/622, 29/825, 854, 900; 310/308–310; 361/207, 361/225; 322/2 A
See application file for complete search history.

(56) References Cited

U.S. PATENT DOCUMENTS

| | | | | |
|---|---|---|---|---|
| 2,831,988 A | | 4/1958 | Morel | |
| 3,614,481 A | * | 10/1971 | Halliday | 310/309 |
| 4,014,605 A | * | 3/1977 | Fletcher | 399/314 |
| 4,943,750 A | * | 7/1990 | Howe et al. | 310/309 |
| 5,557,596 A | * | 9/1996 | Gibson et al. | 369/101 |
| 5,955,818 A | * | 9/1999 | Bertin et al. | 310/309 |

FOREIGN PATENT DOCUMENTS

| | | |
|---|---|---|
| DE | 1044941 | 11/1958 |
| GB | 719687 | 12/1954 |

* cited by examiner

*Primary Examiner*—A. Dexter Tugbang
*Assistant Examiner*—Donghai D. Nguyen

(57) ABSTRACT

A method of manufacturing an electronic-charge-transferring device includes providing a charged species source and a charge species drain and providing a movable component for transferring charge to the charged species drain. A first protrusion proximate to the moveable component and a second protrusion proximate to the moveable component are also provided. The moveable component is positioned in close proximity to the charged species source, and at least one of the moveable component, the first protrusion and the second protrusion is of a micrometer scale or smaller.

11 Claims, 4 Drawing Sheets

200~# METHOD OF MANUFACTURING A MICROMETER-SCALED ELECTRONIC-CHARGE-TRANSFERRING DEVICE

BACKGROUND OF THE INVENTION

1. Field of the Invention

The present invention relates generally to power supplies for applications and devices that require small, low-cost, high-voltage power supplies. These power supplies can be used, for example, in high-density and ultra-high-density data storage devices.

2. Description of the Related Art

FIG. 1 illustrates a portion of a Van De Graaf apparatus according to the related art. A Van De Graaf apparatus is typically manufactured on a macroscopic scale and is often used to raise the hair of students during high school science demonstrations as the students touch the apparatus with their hands.

The portion of the apparatus illustrated in FIG. 1 has a charged species source 10 that is connected to an electrical ground 20. In close proximity to the edge or tip of the charged species source 10 is a belt 30 that is wrapped around a first roller 40 and a second roller 50. The belt 30 travels in a closed path around the rollers 40, 50 as the rollers 40, 50 turn or spin about their fixed axes 45, 55.

The first roller 40 is either positively or negatively charged and the second roller 50 either remains uncharged or is oppositely charged relative to the first roller 40. Away from the charged species source 10, but also proximate to the belt 30, is positioned a charged species drain 60. The charged species drain 60 is electrically connected to a device 70 such as a power supply or capacitor. During operation, the Van De Graaf apparatus supplies a current to the device 70.

The charged species source 10 generally is made from a metal or other conductive material. The charged species source 10 generally takes the shape of a pin or a comb. However, other geometries are sometimes used.

The belt 30 is typically made of rubber. The first roller 40 typically is made from a material other than rubber. The second roller 50 is typically made of a material that is neither the material used to make the belt 30 nor the material used to make the first roller 40. However, under certain circumstances, the second roller 50 and the belt 30 are made from the same material.

The charged species drain 60 can be made from a metal or other conducting material. The charged species drain 60 is often in the shape of a pin or a comb, although other geometries are sometimes used. The device 70 to which the charged species drain 60 is electrically connected can be any type of apparatus that would benefit from a high potential current being supplied to it.

When operating the Van De Graaf apparatus, the first roller 40 typically undergoes a charging process. The first roller 40 can be either positively or negatively charged, depending on the type of charged species that are used to supply current to the device 70. For example, if electrons are used, the first roller 40 is positively charged.

In order to charge the first roller 40, charged species may be supplied to the first roller 40 from an outside source. Alternatively, the first roller 40 can be tribocharged.

Tribocharging involves "frictional charging" between two contacting surfaces that are made from different materials. Since different materials attract electrons with different amounts of force, tribocharging operates on the principle that, when two different materials rub against each other, the electrons in the surface atoms of one material will be more strongly attracted to the other material and will effectively "tear off" of one material in order to attach themselves to the other. If the materials continue to rub against each other over time, one material will become more and more negatively charged while the other material will become more and more positively charged as surface atom electrons continue to move from one material to the other.

In FIG. 1, the surfaces of the first roller 40 and of the belt 30 move relative to each other when the first roller 40 turns and moves the belt 30. Also, because the belt 30 and first roller 40 are made from different materials, charged species from the surface of the belt 30 are transferred to the surface of the first roller 40. Therefore, over time the first roller 40 becomes charged. The belt also gets charged, but because it is larger, the charged species are more diffuse.

When it is desirable for the second roller 50 to be oppositely charged relative to the first roller 40, the material from which the second roller 50 is made can be chosen such that, as the surface of the belt 30 moves relative to the second roller 50, tribocharging occurs that is opposite in polarity to the tribocharging that occurs between the first roller 40 and the belt 30. In other words, in FIG. 1, the belt 30 can tribocharge the first roller 40 with one type of charged specie and can charge the second roller 50 with an oppositely charged specie.

When, on the other hand, it is desirable that an uncharged second roller 50 be used, the belt 30 and the second roller 50 can be manufactured from the same material, thereby preventing tribocharging. Also, even if different materials are used to make the belt 30 and second roller 50, the charged species that build up in the second roller 50 can be quickly removed by an external electrical connection.

Once the desired charging has occurred in each of the rollers 40, 50, the charged species source 10 is "turned on" and charged species begin to flow towards the tip of the charged species source 10 closest to the belt 30. The charged species at the tip of the charged species source 10 then get attracted by the charged first roller 40 and travel towards it. However, the charged species do not travel through the belt 30 and therefore effectively become attached to the belt 30.

Once the charged species are attached to the belt 30, the moving belt 30 transports the charged species from a position near the first roller 40 to a position near the oppositely charged or uncharged second roller 50. Once the charged species are near the second roller 50, they either experience no electrostatic forces between themselves and the second roller 50 or experience repulsive electrostatic forces that repel the charged species away from the second roller 50.

The unattracted or repelled charged species them approach the charged species drain 60. When the species get close enough to the drain 60, they move off of the surface of the belt 30, through the drain 60, and to the device 70 where they supply a current at a high electrostatic potential.

The related art device illustrated in FIG. 1 has the disadvantage that it can only be used on a macroscopic scale. Further, a significant amount of energy is required to move the belt 30 by using the first roller 40 and second roller 50.

BRIEF SUMMARY OF THE INVENTION

A method of manufacturing an electronic-charge-transferring device that includes providing a charged species source and a charge species drain, and manufacturing a moveable component for transferring charge to the charged species drain, a first protrusion proximate to the moveable component, and a second protrusion proximate to the moveable component, wherein the moveable component is positioned in close proximity to the charged species source, and wherein at least one of the moveable component, the first protrusion and the second protrusion is micro-manufactured.

A method of transferring electric charge that includes providing a first charged species source and a first charged species drain, micro-manufacturing at least one of a first moveable component, a first protrusion, and a second protrusion, wherein the moveable component is positioned proximate to the first charged species source and the first charged species drain, and wherein the first protrusion and the second protrusion each contact the first moveable component, and moving the first moveable component relative to the first charged species source and the first charged species drain.

A van de graaf device that includes a moveable component, a charged species source proximate to the moveable component, a charged species drain proximate to the moveable component, a first protrusion contacting the moveable component, and a second protrusion contacting the moveable component, wherein at least one of the moveable component, the first protrusion and the second protrusion is micro-machined.

BRIEF DESCRIPTION OF THE DRAWINGS

The invention will be described by way of example, in the description of exemplary embodiments, with particular reference to the accompanying drawings in which.

DETAILED DESCRIPTION OF THE INVENTION

Figure 1:
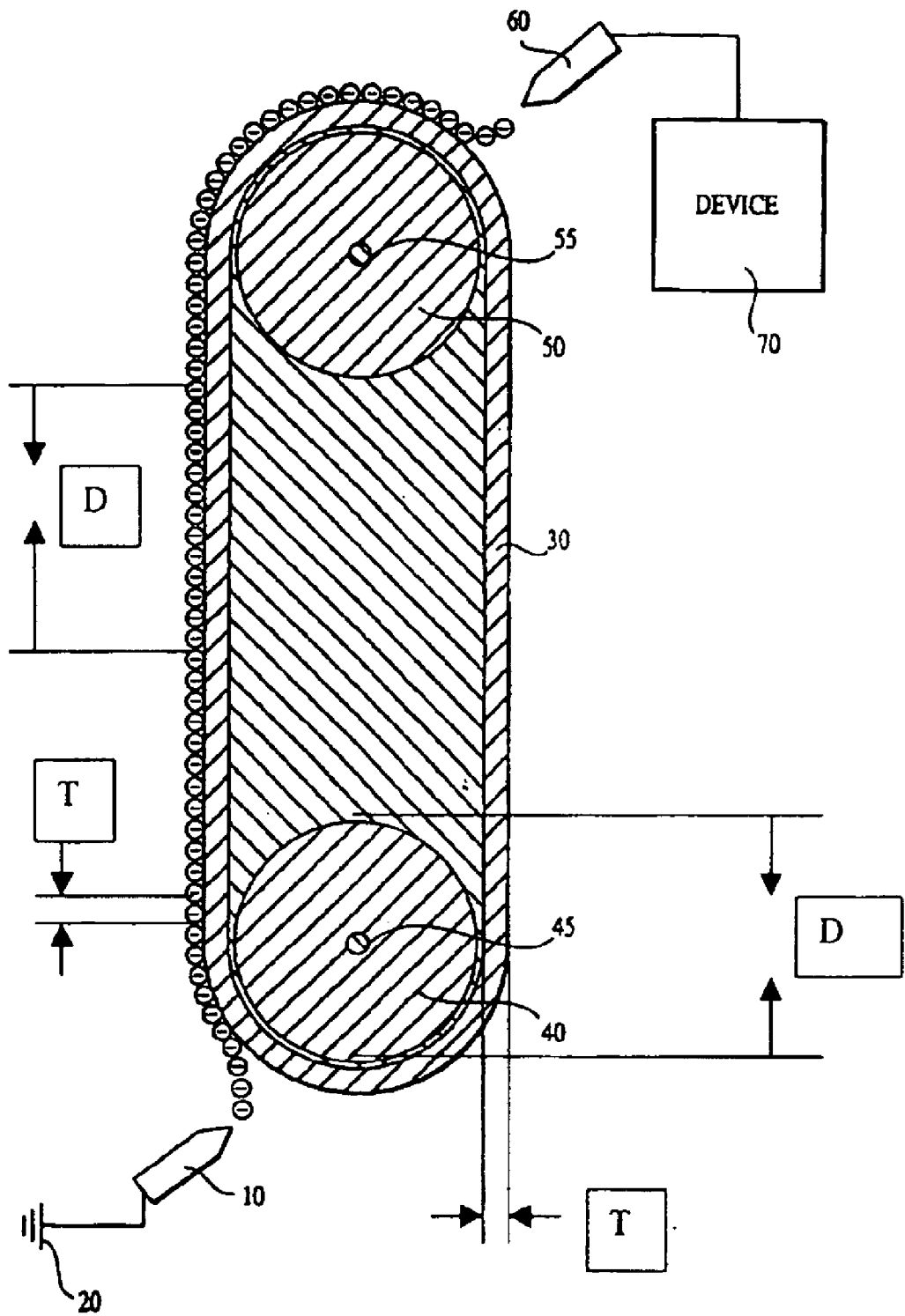
FIG. 1 illustrates several components of a macroscopic Van de Graaf apparatus according to the related art.
Figure 2:
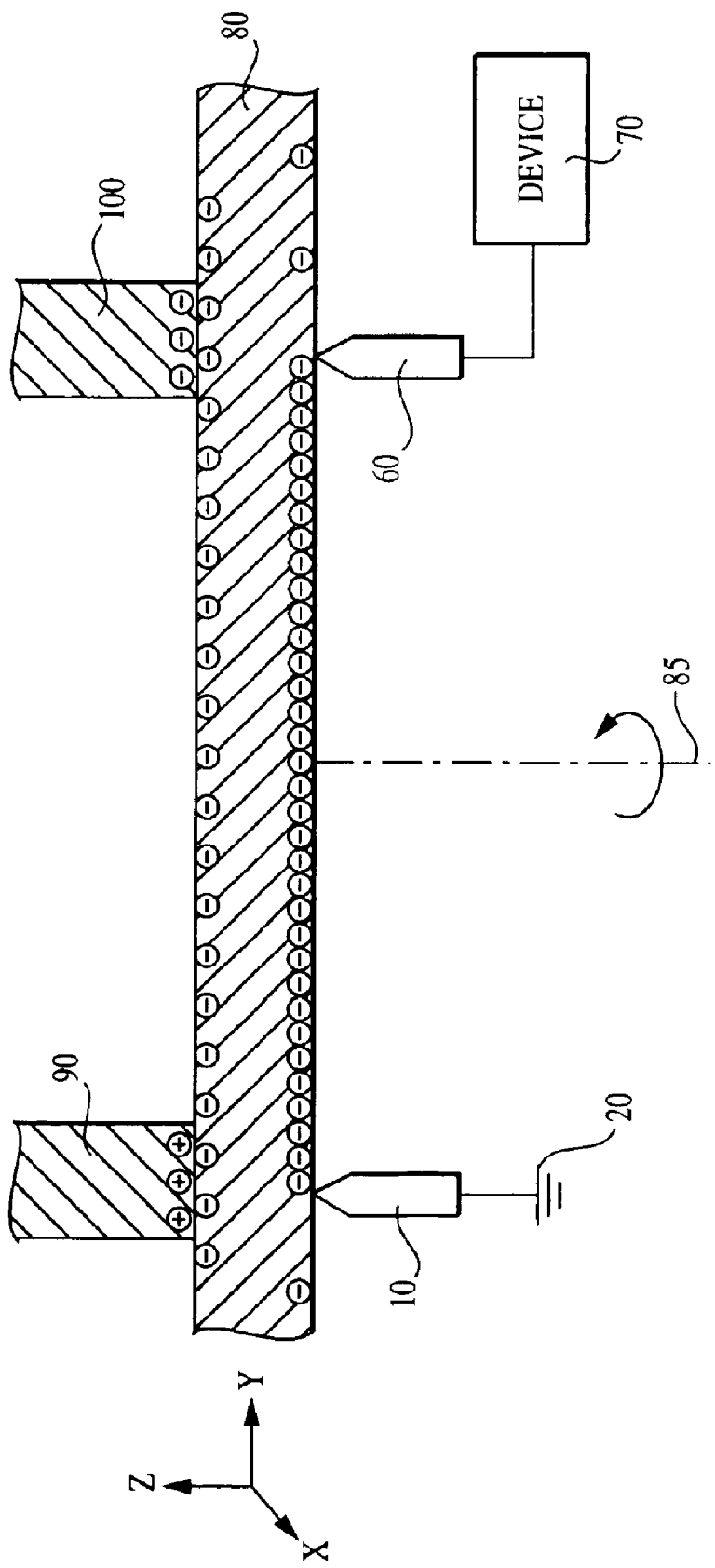
FIG. 2 illustrates one embodiment of a microscopic or nanoscopic Van de Graaf apparatus according to the present invention.

FIG. 2 illustrates an embodiment of a micro-fabricated Van De Graaf apparatus according to the present invention. The apparatus illustrated in FIG. 2 includes a charged species source 10 connected to a electronic ground 20.

The apparatus of FIG. 2 also includes a charged species drain 60 electrically connected to a device 70. Both the charged species source 10 and drain 60 are positioned either proximate to, or in contact with, a plate 80. The plate 80 can be any component that has the ability to move relative to the source 10 and drain 60. For example, the plate 80 may be able to translate relative to the source 10 and drain 60 or may be able to rotate about a rotation axis 85. In those embodiments where the plate 80 translates, a micromover (not illustrated), such as the one disclosed in U.S. Pat. No. 5,557,596 to Gibson, et al., may be used. The plate 80, source 10, and drain 60 can all be manufactured according to standard micro-machining techniques or can be manufactured on a nanometer scale.

Also included in the apparatus illustrated in FIG. 2 is a first protrusion 90 and a second protrusion 100, each positioned in contact with the plate 80. The plate 80 can move relative to the protrusions 90, 100 either by translating or rotating.

A micro-fabricated van de graaf apparatus can be used in a variety of applications. For example, such an apparatus can be used to supply current to a micro-fabricated device such as, but not limited to, a power supply or data storage device like the ultra-high density storage device disclosed in U.S. Pat. No. 5,557,596 to Gibson, et al.

The source 10 and the drain 60 can each be of any geometry including, but not limited to, a pin or a comb. The source 10 and drain 60 can be made from or include a conductive material such as, but not limited to, a metal or metal alloy.

The plate 80 can be made from or include a material that is capable of being micro-manufactured or nano-manufactured. According to certain embodiments, the material is one that is capable of moving relative to the protrusions 90, 100 without experiencing significant wear. In other words, in certain embodiments, the plate 80 is able to move relative to the protrusions 90, 100 a number of times, and in one or more directions, without failing.

The plate 80 can be manufactured to include a non-conductive material. For example, the translating plate 80 can include a rubber-like material or a polymer material such as, but not limited to, a photoresist layer that has been hardened to resist wear.

The protrusions 90, 100 can be micro-manufactured and can be chosen to have dimensions on a micro-meter scale or smaller. The first protrusion 90 can include a material that is different from a material included in either the plate 80 or the second protrusion 100. The second protrusion 100 can include a material that is also different from a material in the first protrusion 90 and the plate 80.

During operation, the source 10 is "turned on" and charged species flow to the tip of the source 10 closest to the plate 80. The plate 80 (or another moveable component) can be made to oscillate along a direction parallel to the surfaces of the protrusions 90, 100 that are in contact with the plate 80. For example, in the Cartesian coordinate system illustrated on the left of FIG. 2, the plate 80 can translate across the xy-plane or may rotate around the rotation axis 85.

Also during operation, the first protrusion 90 can be charged opposite to the charge of the species that flow from the source 10. Charging of the first protrusion 90 can either be done by an external device or by tribocharging with the plate 80 as the plate 80 moves relative to the first protrusion 90.

The second protrusion 100 can be of the same polarity as the charged species that are emanating from the source 10. On the other hand, the second protrusion 100 can remain uncharged. When the second protrusion 100 remains uncharged, charge can either be removed from the second protrusion 100 by an external device or the second protrusion 100 can be chosen such that it contains the same materials as the plate 80 and therefore does not tribocharge.

Once the electron source 10 begins to have charge species flowing from its tip, the charged species can be attracted to the first protrusion 90 because of the opposite polarity of the first protrusion 90. However, the charged species do not travel through the plate 80 and instead collect on the surface of the plate 80. When the plate 80 moves relative to the first protrusion 90 and toward the drain 60, the charged species on the surface of the plate 80 are also moved towards the drain 60.

Once the charged species are near the drain 60, the second protrusion 100 either provides a repulsive electrostatic force or provides no electrostatic force. Either way, the charged species can be attracted to the drain 60 and migrate through the drain 60 and towards the device 70, thereby supplying the device 70 with a current.

The source 10 and drain 60 are generally positioned in close proximity to the plate 80. As discussed above, the plate 80 can be rotated around the fixed rotation axis 85. Under a rotating plate 80 configuration, the charged species on the surface of the plate 80 travel through a semicircular path instead of a linear one. Nonetheless, a current is still generated and supplied to the device 70.

According to other embodiments of the present invention, multiple sources 10 and drains 60 can be used in conjunction with one or more plates 80, first protrusions 90 and second protrusions 100. When multiple micro-fabricated Van De Graaf apparatuses are micro-manufactured and operated at the same time, each plate 80 can be oscillated between the sources 10 and drains 60 at periodic rates that are out of phase with each other.

In other words, when one translating plate 80 is at the beginning of an oscillation between a source 10 and a drain 60, another translating plate 80 can be half-way through its oscillation, and yet a third translating plate 80 can be at the end of its oscillation towards a drain 60, and in the process of moving back towards a source 10. When simultaneous translating plates 80 are in operation and oscillating out of phase with each other, a more steady current can be generated to the device 70. When a rotating plate 80 is used, multiple sources 10, drains 60 and first and second protrusions 90, 100 can still be used, but the net effect would be an increasing current to the device 70.

When a translating plate 80 is used, the length of the translating plate 80 often defines the distance over which the plate 80 oscillates. Since a portion of the plate generally remains over the source 10 in order to pick up charge species that are then translated to the electron drain 60, once the source 10 is near the edge of the translating plate 80, the oscillation reverses itself and the translating plate 80 is generally reset to its initial position. Then, the entire process is resumed as the plate 80 once again picks up and translates charged species between the source 10 and the drain 60.

During the resetting, because charged species are no longer transported from the source 10 to the drain 60, current generally does not flow to the device 70. However, the embodiments where a rotating plate 80 spins about a rotation axis can provide continuous current to the device 70 because no resetting is necessary. Further, the staggered oscillations of the plates 80 discussed above can also provide constant current.

Figure 3:
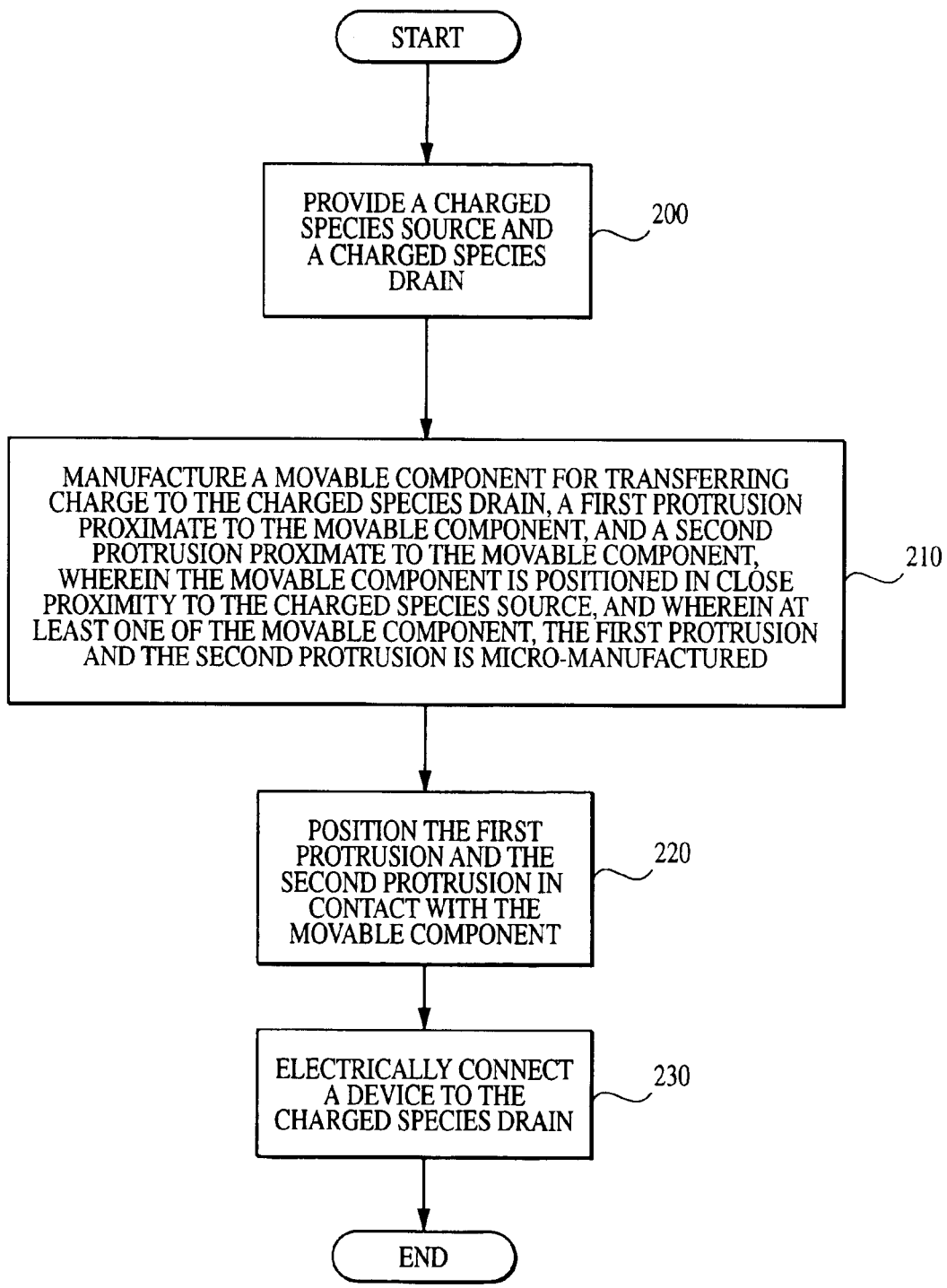
FIG. 3 illustrates a flowchart of a method of manufacturing an electronic-charge-transferring device according to certain embodiments of the present invention.

FIG. 3 illustrates a flowchart of a method of manufacturing an electronic-charge-transferring device according to certain embodiments of the present invention. This method may start with step 200, which specifies that a charged species source 10 and a charged species drain 60 be provided. According to certain embodiments, the source 10 and drain 60 can be micro-manufactured, though no particular size limitations are made on the source 10 and drain 60. Step 200 may also provide the source 10 and drain 60 to be in contact with a moveable component, such as, but not limited to, the plate 80 illustrated in FIG. 2.

Step 210 specifies the manufacture of the moveable component for transferring charge to the charged species drain 60, a first protrusion 90 proximate to the moveable component, and a second protrusion 100 proximate to the moveable component, wherein the moveable component is positioned in close proximity to the charged species source 10, and wherein at least one of the moveable component, the first protrusion 90 and the second protrusion 100 is micro-manufactured. Step 210 may, according to certain embodiments, specify including a first material in the first protrusion 90 and a second material, different from the first material, in the second protrusion 100. Further, step 210 may specify including a third material, different from the first material and the second material, in the moveable component.

Step 220 specifies that the first protrusion 90 and the second protrusion 100 be positioned in contact with the moveable component. In such embodiment, there is friction between the protrusions 90, 100 and the moveable component.

Step 230 specifies that a device 70 be electrically connected to the charged species drain 60. Any device 70 is within the scope of the present invention, so long as the device 70 could benefit from the current of charged species flowing through the drain 60.

Figure 4:
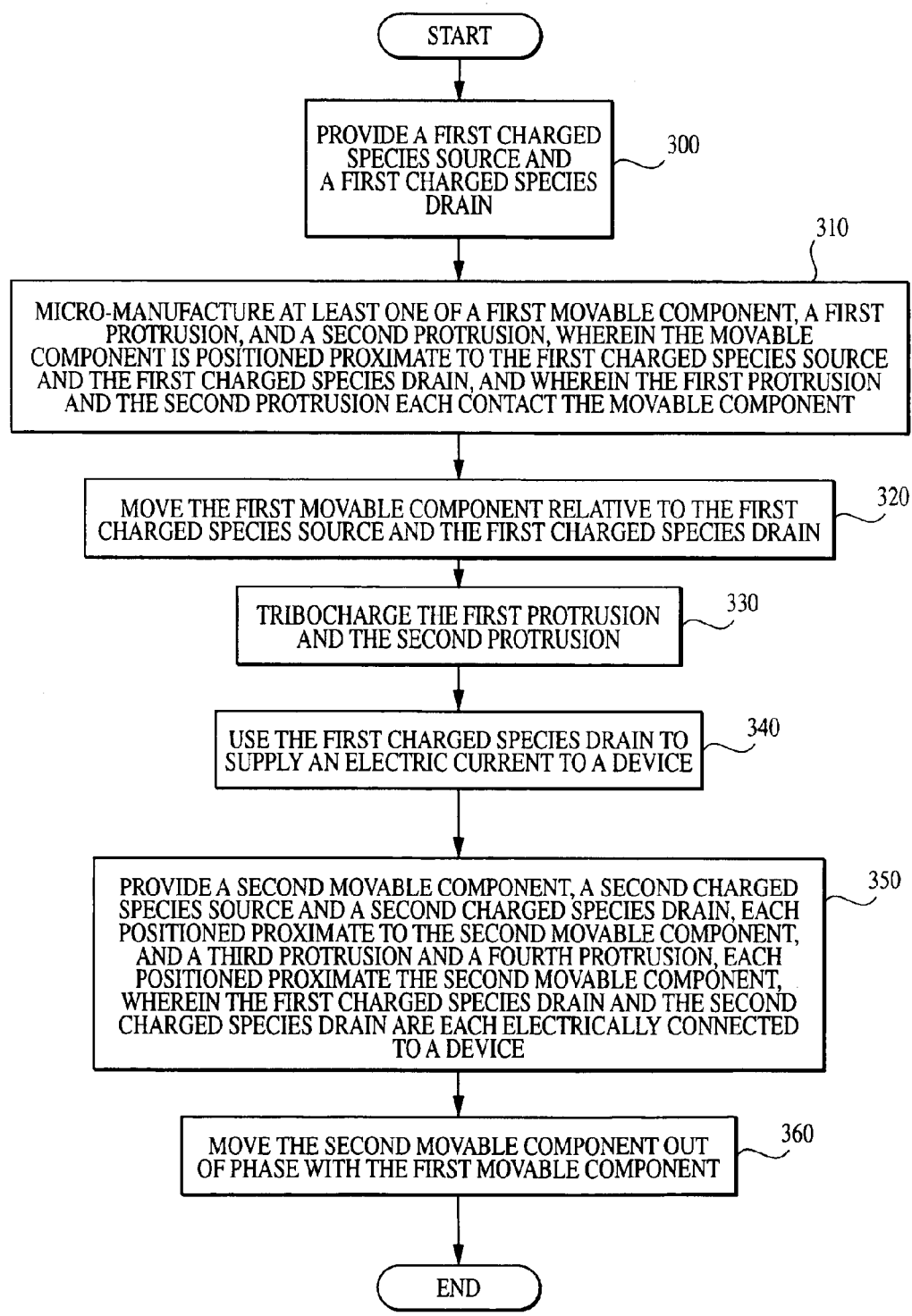
FIG. 4 illustrates a flowchart of a method of transferring electric charge according to certain embodiments of the present invention.

FIG. 4 illustrates a flowchart of a method of transferring electric charge according to certain embodiments of the present invention. According to FIG. 4, step 300 specifies that a first charged species source 10 and a first charged species drain 60 be provided. The source 10 and drain 60 may be micro-manufactured, although no particular size restrictions are placed on either the source 10 or the drain 60.

Step 310 specifies micro-manufacture at least one of a first moveable component, a first protrusion 90, and a second protrusion 100, wherein the moveable component is positioned proximate to the first charged species source 10 and the first charged species drain 60, and wherein the first protrusion 90 and the second protrusion 100 each contact the first moveable component. Also, although step 310 specifies micro-manufacturing, nanometer-scaled manufacturing and larger-scaled manufacturing are also within the scope of certain embodiments of the present invention.

Step 320 specifies moving the first moveable component relative to the first charged species source 10 and the first charged species drain 60. According to certain embodiments of the present invention, the moving step 320 includes translating the first moveable component relative to the first charged species source 10. According to other embodiments, the first moveable component may be rotated about a rotation axis 85.

Step 330 specifies tribocharging the first protrusion 90 and the second protrusion 100. Then, according to step 340, the first charged species drain 60 may be used to supply an electric current to a device 70. The device 70 may be any item that would benefit from being supplied from an electrical current.

Step 350 then specifies providing a second moveable component, a second charged species source, and a second charged species drain, each positioned proximate to the second moveable component, and a third protrusion and a fourth protrusion, each positioned proximate the second moveable component, wherein the first charged species drain 60 and the second charged species drain are each electrically connected to a device 70. Step 360 then specifies moving the second moveable component out of phase with the first moveable component. In such a configuration, when a translating first moveable component is moving away from the first charged species drain 60, the second moveable component may move toward the second charged species drain, thereby providing the device 70 with a more steady electric current.

The foregoing detailed description has been given for understanding exemplary implementations of the invention only and no unnecessary limitations should be understood therefrom as modifications will be obvious to those skilled in the art without departing from the scope of the appended claims and their equivalents.

What is claimed is:

1. A method of manufacturing an electronic-charge-transferring device comprising:
   providing a charged species source emitting charged species;
   providing a charged species drain receiving the charged species;
   positioning a movable component, having a size of a micrometer scale or smaller and being operable to transfer the charged species to the charged species drain, in close proximity to the charged species source, wherein the movable component is a nonconductive plate;
   positioning a first protrusion having a size of a micrometer scale or smaller proximate to a first surface of the moveable component;
   positioning the charged species source proximate a second surface of the moveable component, such that the movable component is between the first protrusion and the charged species source;
   positioning a second protrusion having a size of a micrometer scale or smaller proximate to the first surface the moveable component; and
   positioning the charged species drain proximate the second surface of the moveable component, such that the movable component is between the second protrusion and the charged species drain.

2. The method of claim 1, wherein the providing a charged species source and a charge species drain step comprises providing a charged species source having a size of a micrometer scale or smaller.

3. The method of claim 1, wherein the providing a charged species source and a charge species drain stop comprises providing a charged species drain having a size of a micrometer scale or smaller.

4. The method of claim 1, wherein the providing a charged species source and a charged species drain step comprises providing the charged species source and the charged species drain in contact with the moveable component.

5. The method of claim 1, further comprising including a first material in the first protrusion and a second material, different from the first material, in the second protrusion.

6. The method of claim 5, further comprising including a third material, different from the first material and the second material, in the moveable component.

7. The method of claim 1, further comprising positioning the first protrusion and the second protrusion in contact with the moveable component.

8. The method of claim 1, further comprising electrically connecting a device to the charged species drain.

9. The method of claim 1, wherein at least one of the moveable component, the first protrusion and the second protrusion is of a nanometer scale.

10. The method of claim 1, wherein at least one of the charged species source and the charged species drain is of a nanometer scale.

11. The method of claim 1, wherein the movable component is operable to be one of rotated and translated.

* * * * *